United States Patent [19]

Kimura et al.

[11] Patent Number: 4,562,446

[45] Date of Patent: Dec. 31, 1985

[54] INK-DOT PRINTER WITH MAGNETIC INK ATTRACTING AND RETENTION PREVENTING MEANS

[75] Inventors: Tutomu Kimura; Takeyoshi Tsuge; Yoshihiro Torisawa; Ayumu Makino, all of Mishima, Japan

[73] Assignee: Tokyo Electric Co. Ltd., Tokyo, Japan

[21] Appl. No.: 592,573

[22] Filed: Mar. 23, 1984

[30] Foreign Application Priority Data

| | | | |
|---|---|---|---|
| Apr. 1, 1983 | [JP] | Japan | 58-56983 |
| Apr. 12, 1983 | [JP] | Japan | 58-64229 |
| Apr. 12, 1983 | [JP] | Japan | 58-64230 |

[51] Int. Cl.[4] .......... G01D 15/16

[52] U.S. Cl. .......... 346/140 R; 400/124

[58] Field of Search .......... 346/140 PD, 141; 400/124

[56] References Cited

FOREIGN PATENT DOCUMENTS

| | | | |
|---|---|---|---|
| 0042293 | 12/1981 | European Pat. Off. . | |
| 56-95682 | 9/1980 | Japan . | |
| 57-188382 | 11/1982 | Japan | 400/124 |

OTHER PUBLICATIONS

Hawley, Condensed Chemical Dictionary, p. 705, 9th Ed., ©1977, VanNostrand Reinhold Co.

*Primary Examiner*—E. A. Goldberg
*Assistant Examiner*—Mark Reinhart
*Attorney, Agent, or Firm*—Frishauf, Holtz, Goodman & Woodward

[57] ABSTRACT

An ink-dot printer comprises a magnetic ink storage tank storing magnetic ink, a pair of pole plates facing each other so as to define a slit one end portion of which is contacted with the magnetic ink supplied from the magnetic ink storage tank, an electromagnet for magnetizing the pole plates, thereby feeding the magnetic ink from the magnetic ink storage tank into the slit to form a magnetic ink curtain in the slit, and a plurality of needles arranged adjacent to one another along the longitudinal direction of the slit and adapted selectively to move in the longitudinal direction thereof between a first position where one end portion of each needle is immersed in the magnetic ink curtain in the slit and a second position where the one end portion is projected from the magnetic ink curtain in the slit, the cross-sectional area of the one end portion of each needle being made to narrower than that of the remaining portion of the needle so that the distance between the one end portions of any two adjacent needles is widened to prevent the magnetic ink from being retained between the portions adjacent to the end faces of the one end portions by surface tension when the two needles are simultaneously located in the second position.

23 Claims, 27 Drawing Figures

INK-DOT PRINTER WITH MAGNETIC INK ATTRACTING AND RETENTION PREVENTING MEANS

BACKGROUND OF THE INVENTION

The present invention relates to an ink-dot printer which comprises: a magnetic ink storage means storing magnetic ink; a pair of pole plates facing each other so as to define a slit, one end portion of which is contacted with the magnetic ink supplied from the magnetic ink storage means; a magnetic field generating means for magnetizing the pole plates, thereby feeding the magnetic ink from the magnetic ink storage means into the slit to form a magnetic ink curtain in the slit; and a plurality of needles arranged adjacent to one another along the longitudinal direction of the slit and adapted selectively to move in the longitudinal direction of each needle between a first position where one end portion of each needle is immersed in the magnetic ink curtain in the slit between the pole plates and a second position where the one end portion is projected from the magnetic ink curtain in the slit, and wherein the needles are selectively moved from the first position to the second position so that the end faces of the one end portions of the needles are brought into contact with a recording sheet as a recording section, thereby forming a set of magnetic ink-dots thereon which are used to print a symbol such as a character, figure, etc.

Wire-dot printers and thermal printers are currently used. In the wire-dot printers, a plurality of needles are selectively driven so that the end faces of the distal end portions of the needles are caused to strike directly against pressure-sensitive manifold paper on a platen or to strike indirectly against recording paper on the platen through a printing ribbon, thereby forming a set of dots on the pressure-sensitive manifold paper or recording paper. The resulting set of dots constitutes a print which represents a symbol such as a character or figure. In the prior art wire-dot printers with this arrangement, however, the printing of symbols on the pressure-sensitive manifold paper or recording paper produces a lot of noise. Moreover, these printers only permit the use of pressure-sensitive manifold paper, and require expensive printing ribbons which must be frequently replaced.

In order to eliminate the drawbacks of the prior art wire-dot printers, there are proposed various ink-dot printers adopting a system in which magnetic ink is applied to the distal end portions of a plurality of needles. The needles are selectively driven so that the magnetic ink on the end faces of the distal end portions of the driven needles is transferred to a recording sheet on a platen. In these currently proposed ink-dot printers, however, when two adjacent needles are simultaneously driven to form dots on the recording sheet, the magnetic ink is often held between the distal end portions of the two needles by the action of surface tension. Magnetic ink between the distal end portions of the needles can sometimes stick to the recording sheet in bulk when magnetic ink on the end faces of the distal end portions is transferred to the recording sheet, forming spots large enough to blur print.

In forming a number of dots by repeatedly driving a single needle, in the presently proposed ink-dot printers, the drive of the needle will have to be repeated before the magnetic ink can fully be attached to the end face of the needle. Therefore, the amount of magnetic ink on the end face of the distal end portion will gradually be reduced, so that dots printed later will be faded possibly resulting in a blurry print.

SUMMARY OF THE INVENTION

The present invention is contrived in consideration of these circumstances, and a first object of the invention is to provide an ink-dot printer capable of preventing magnetic ink from being retained by the surface tension between the distal end portions of two adjacent needles which are driven and projected simultaneously to form dots, thereby ensuring clear print without any noticeable spots.

A second object of the invention is to provide an ink-dot printer capable of constantly applying sufficient magnetic ink to the end face of the distal end portion of a needle even though the single needle is repeatedly driven in a consecutive manner, thereby forming dots of a uniform density which make a distinct print, as well as of the aforementioned function as the first object.

The first object of the invention may be attained by an ink-dot printer which comprises: a magnetic ink storage means storing magnetic ink; a pair of pole plates facing each other so as to define a slit one end portion of which is contacted with the magnetic ink supplied from the magnetic ink storage means; a magnetic field generating means for magnetizing the pole plates, thereby feeding the magnetic ink from the magnetic ink storage means into the slit to form a magnetic ink curtain in the slit; a plurality of needles arranged adjacent to one another along the longitudinal direction of the slit and adapted selectively to move in the longitudinal direction thereof between a first position where one end portion of each needle is immersed in the magnetic ink curtain in the slit between the pole plates and a second position where the one end portion is projected from the magnetic ink curtain in the slit; and which is characterized by further comprising a magnetic ink retention preventing means which prevents the magnetic ink from being retained between the one end portions of any two adjacent needles by surface tension when the two needles are simultaneously located in the second position.

In the ink-dot printer of the invention, the magnetic ink retention preventing means may be formed by coating the peripheral surface of the respective one end portions of the needles with a water repellent.

With this arrangement, the magnetic ink retention preventing means may be manufactured at a very low cost. In this case, polytetrafluoroethylene is preferably used for the water repellent. This compound is high in durability, low-priced, and easily available.

In the ink-dot printer of the invention, moreover, the magnetic field generating means is preferably an electromagnet.

With this arrangement, the magnetic ink can be fed into the slit between the pair of pole plates so that the one end portions of the needles in the first position are immersed in the magnetic ink in the slit only during the use of the ink-dot printer. Therefore, the magnetic ink can be prevented from drying in the slit, or from clinging to the surface of the slit or the one end portions of the needles while the printer is not in use.

In the ink-dot printer of the invention, furthermore, the magnetic ink retention preventing means may be formed by making the cross-sectional area of the one end portion of each needle narrower than that of the remaining portion of the needle so that the distance between the one end portions of each two adjacent needles is widened to prevent the magnetic ink from being retained between the portion adjacent to the end face of the one end portions by surface tension when the two needles are simultaneously located in the second position.

With this arrangement, the magnetic ink retention preventing means may be used indefinitely, and its maintenance may be much easier than in the case where water repellent is used for this purpose.

In the ink-dot printer of the invention, if the cross-sectional area of the one end portion of each needle is narrowed in the aforementioned manner, the distance from the border between the one end portion and the remaining portion of each needle in the first position to the outer surface of the magnetic ink curtain in the slit facing the border is preferably greater than the distance between the first and second positions of the needle.

With this arrangement, even though a step is formed on the border between the distal end portion and the remaining portion of each needle, magnetic ink from the magnetic ink curtain will never be splashed on the recording sheet when the needles move from the first position to the second position, since the step is kept from running against the outer surface of the magnetic ink curtain in the slit between the pair of pole plates.

In the ink-dot printer of the invention, moreover, if the cross-sectional area of the one end portion of each needle is narrowed in the aforementioned manner, that cross section of the one end portion should preferably be circular as structures with a circular cross section are the easiest to manufacture.

In this case, however, the cross section of the one end portion of each needle may alternatively be formed as a semicircle or as a polygonal.

The aforementioned first and second objects of the invention may be attained by further comprising a magnetic ink attracting means for causing magnetic ink in the magnetic ink curtain in the slit to be coercively attached to the end face of the one end portion of each said needle.

In this ink-dot printer, the magnetic ink attracting means is preferably formed by magnetizing the one end portion of each needle. The one end portion of the needle can easily be magnetized at a low cost.

In this improved ink-dot printer, moreover, the magnetic ink attracting means may be formed by burying a magnet in each end face of the one end portion of each needle, or by forming individual recesses in each end face of the one end portions of each needle.

In the latter case, each recess may be a through hole extending in the longitudinal direction of each needle. This arrangement facilitates feeding magnetic ink into the recesses.

One embodiment of the present invention will now be described in detail with reference to the accompanying drawings.

DETAILED DESCRIPTION OF THE PREFERRED EMBODIMENT

Figure 1:
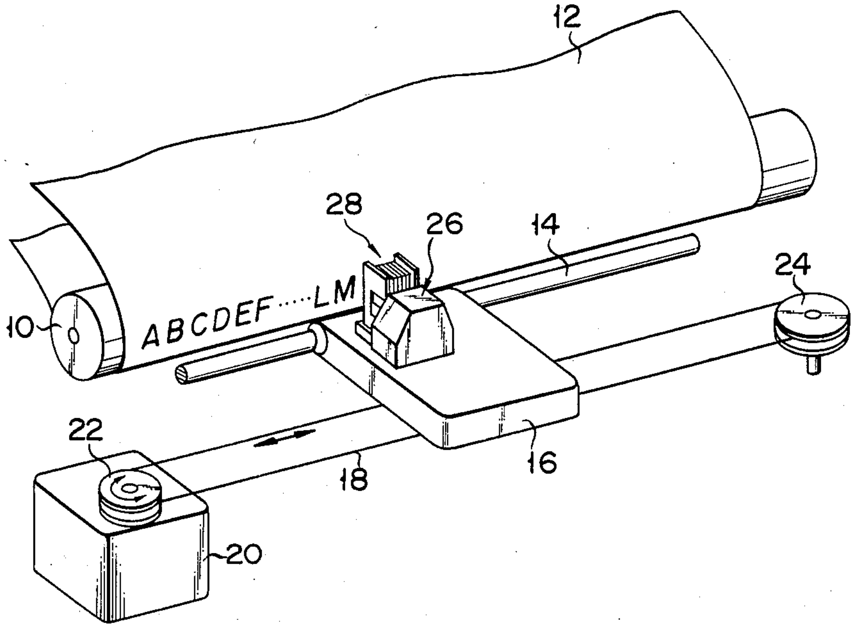
FIG. 1 is a perspective view schematically showing an outline of an ink-dot printer according to one embodiment of the present invention.

As shown in FIG. 1, a recording sheet 12 as a recording section is passed around a platen 10. A carriage 16 is disposed in front of the platen 10 so as to reciprocate along a guide shaft 14 which extends parallel to the platen 10. The carriage 16 is coupled with a driving wire 18, which is passed around the driving pulley 22 of a motor 20 and a driven pulley 24 spaced from the driving pulley 22 along the platen 10. The carriage 16 is mounted with a needle head 26 and an ink curtain forming unit 28.

Figure 2:
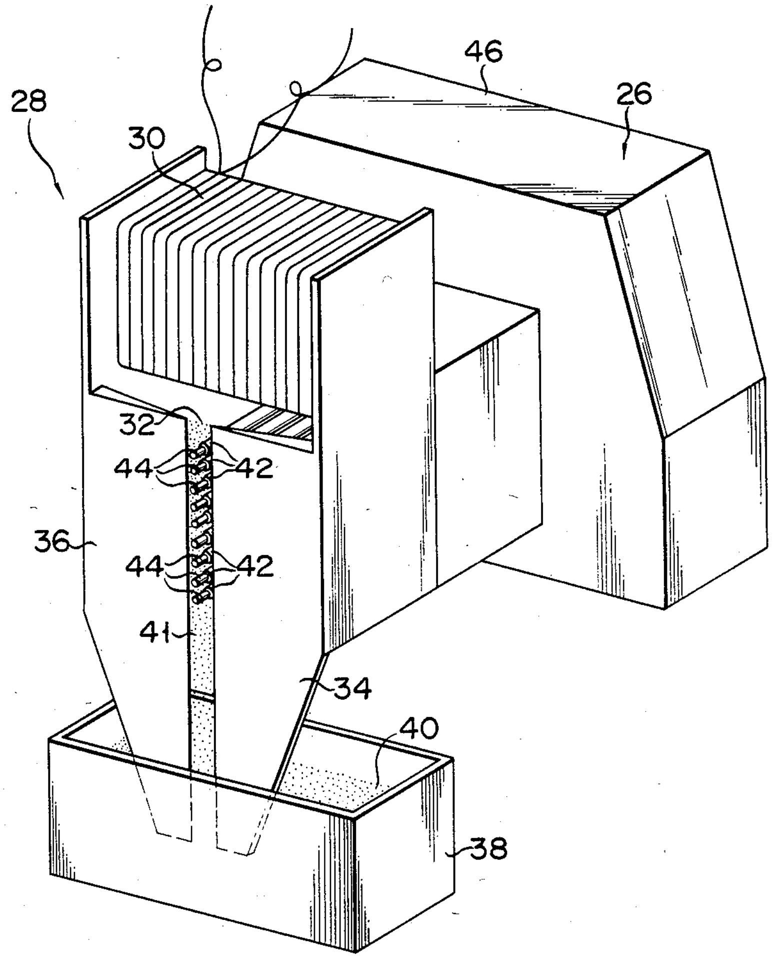
FIG. 2 is a perspective view schematically showing an ink curtain forming unit of the ink-dot printer of FIG. 1.

As shown in FIG. 2, the ink curtain forming unit 28 has an electromagnetic coil 30 as an electromagnet at the upper portion thereof. A pair of pole plates 34 and 36 are coupled individually to both ends of the electromagnetic coil 30, facing each other to define a slit 32. The pole plates 34 and 36 extend downward from their corresponding ends of the electromagnetic coil 30 so that the lower end portion of the slit 32 is contacted with magnetic ink 40 supplied from a magnetic ink storage means 38. In this arrangement, when the electromagnetic coil 30 is energized, magnetic ink 40 supplied from the magnetic ink storage means 38 is sucked into the slit 32 between the pole plates 34 and 36 to form a magnetic ink curtain 41 in the slit 32, as shown in FIG. 2.

Figure 3:
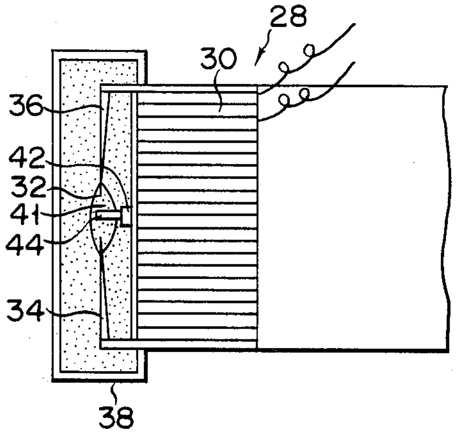
FIG. 3 is a top view schematically showing the ink curtain forming unit of FIG. 2.
Figure 4:
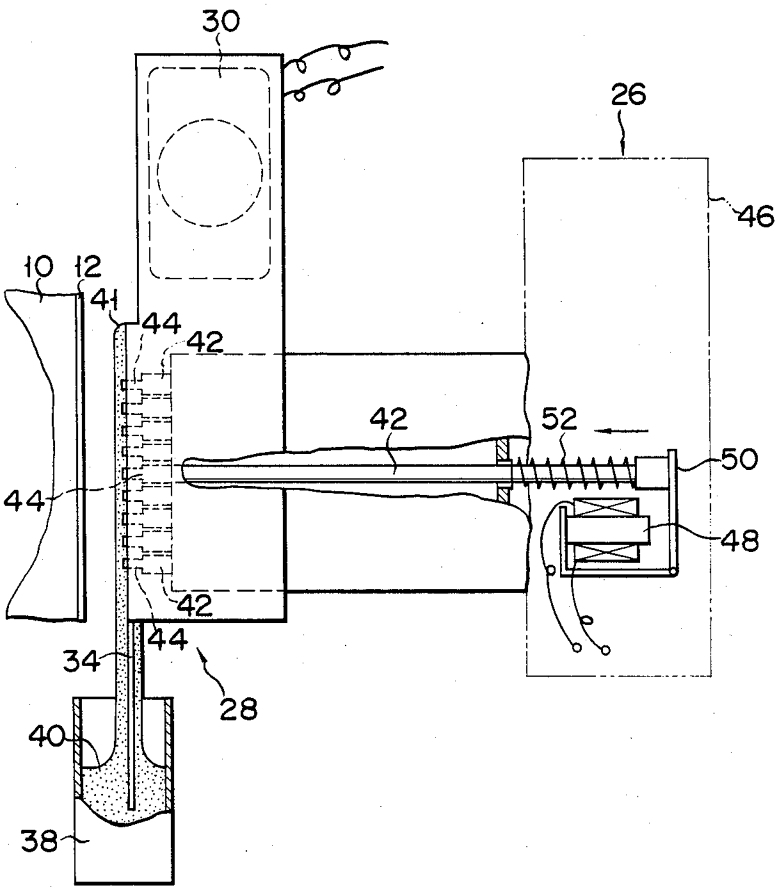
FIG. 4 is a broken away, side view schematically showing the needles of the ink-dot printer of FIG. 1 in the first position.

Arranged in the slit 32 are distal end portions 44 of a plurality of needles 42 which adjoin one another along the longitudinal direction of the slit 32. The distal end portions 44 of the needles 42 are immersed in the magnetic ink curtain 41 in the slit 32, as shown in FIG. 3. The proximal end portions of the needles 42 extend into a cover 46 of the needle head 26, as shown in FIG. 4, and are supported by a conventional guide means so as to be movable along their longitudinal direction. The position of each needle 42 shown in FIG. 4 will hereinafter be referred to as its first position.

Figure 5:
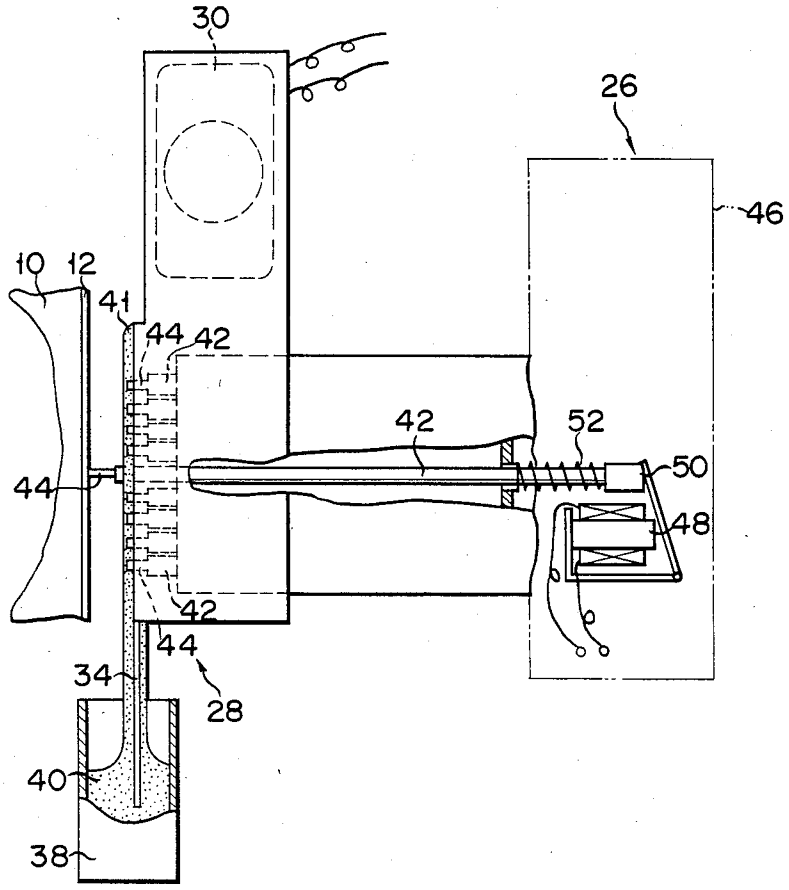
FIG. 5 is a side view similar to FIG. 4 showing the needles of the ink-dot printer of FIG. 1 in the second position.

A plurality of electromagnets 48 for driving the needles 42 are arranged in the cover 46 of the needle head 26. A moving iron 50 coupled to the proximal end of each corresponding needle 42 is set beside each corresponding electromagnet 48. When the electromagnet 48 is energized, the moving iron 50 is attracted thereto against the urging force of a return spring 52 which is wound around the needle 42. As a result, the distal end portion 44 of the needle 42 is projected toward the recording sheet 12 on the platen 10 through the magnetic ink curtain 41 in the slit 32 so that the end face of the distal end portion 44 is brought into contact with the recording sheet 12, as shown in FIG. 5. The position of the needle 42 in contact with the recording sheet 12 will hereinafter be referred to as its second position.

Figure 6:
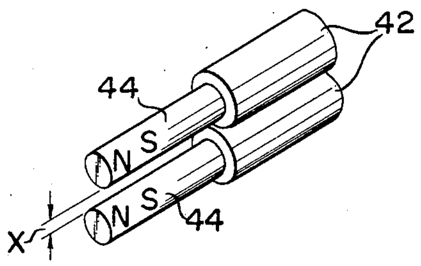
FIG. 6 is an enlarged perspective view showing the distal end portions of the needles shown in FIG. 4.

As shown in detail in FIG. 6, the cross-sectional area of the distal end portion 44 of each needle 42 is narrower than that of the remaining portion of the needle 42. The distal end portion 44 is magnetized so that magnetic ink 40 in the magnetic ink curtain 41 is coercively attached to it, especially its end face. In these figures, a magnetic pole mark is illustrated such that only the distal end portion 44 is magnetized. This is only for ease in explanation. In the present technique, it is to be noted that the whole needle 42 will be magnetized.

Figure 7:
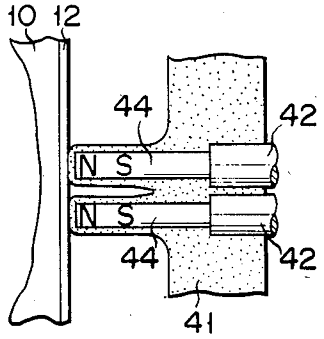
FIG. 7 is an enlarged side view showing the distal end portions of the needles of FIG. 5 located in the second position.

The cross-sectional area of the distal end portion 44 of each needle 42 is such that the distance X between the distal end portions 44 of each two adjacent needles 42 is long enough to prevent magnetic ink 40 from being retained between the distal end portions 44 by surface tension when the two distal end portions 44 are simultaneously located in the second position, as shown in FIG. 7.

In the ink-dot printer according to one embodiment of the present invention constructed in this manner. electric current is supplied to some of the electromagnets 48 corresponding individually to the needles 42 in accordance with a printing instruction given to an electric circuit (not shown) through a keyboard (not shown). Those needles 42 which correspond to the supplied electromagnets 48 are moved from the first position shown in FIG. 4 to the second position shown in FIG. 5. As a result, magnetic ink 40 attached to the end faces of the distal end portions 44 is transferred to the recording sheet 12 on the platen 10 to form dots thereon. A set of these dots constitute a print of a character such as a figure or another symbol. In printing these dots, one needle 42 may be consecutively driven many times (e.g., in forming the crossbar of the character H). In this case, when the needle 42 is returned to the first position, magnetic ink 40 in the magnetic ink curtain 41 in the slit 32 is rapidly attracted to the distal end portion 44 of the needle 42 to be coercively attached to the end face of the distal end portion 44, since the distal end portion 44 is magnetized. Thus, the amount of magnetic ink 40 applied to the end face of the distal end portion 44 of the needle 42 is always sufficient and does not gradually decrease. Therefore, the amount of magnetic ink 40 transferred to the recording sheet 12 is kept constant, so that the density or depth of dots formed by the consecutively repeated drive of even a single needle 42 will be uniform, ensuring a clear print.

The distal end portion 44 of each needle 42 is narrower in its cross-sectional area than the remaining portion of the needle 42, while the distance between the distal end portions 44 of any two adjacent needles 42 is wide. Therefore, magnetic ink 40 will never be retained between the distal end portions 44 of the two adjacent needles 42 by surface tension when the two needles 42 are simultaneously located in the second position, as shown in FIG. 7. Thus, even though two adjacent needles 42 are concurrently located in the second position shown in FIGS. 5 and 7 (e.g., in forming a vertical line of the character H), only that portion of magnetic ink 40 which is applied to the end faces of the distal end portions 44 of the two needles 42 is transferred to the recording sheet 12, ensuring a clear print.

Although an illustrative embodiment of the present invention has been described in detail herein, it is to be understood that the invention is not limited to that precise embodiment, and that various changes and modifications may be effected therein by one skilled in the art without departing from the scope or spirit of the invention.

Figure 8:
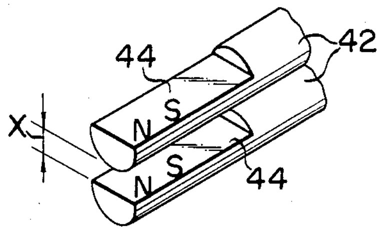
FIGS. 8 to 12 are enlarged perspective views showing needles formed by combining the distal end portions with cross sections having varied shapes with the remaining portions also with cross sections having varied shapes.
Figure 9:
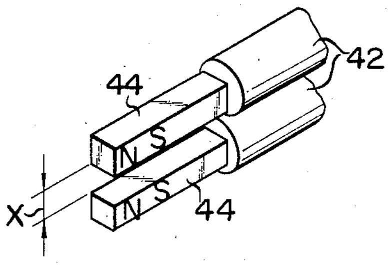
Figure 10:
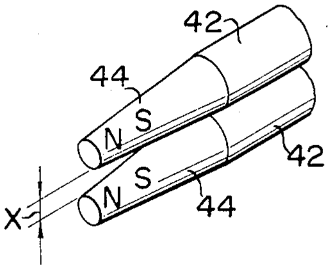
Figure 11:
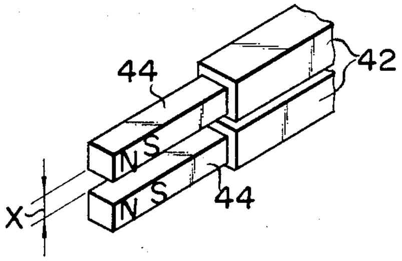
Figure 12:
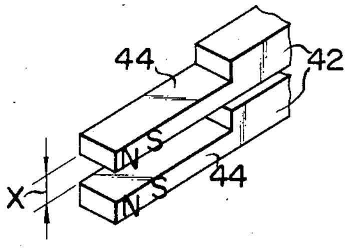

For example, the cross section of the distal end portion 44 of each needle 42 is not limited to the circular shape as shown in FIG. 6. It may be substantially semicircular (FIG. 8) or square (FIG. 9). Alternatively, it may be formed into a triangular, pentagonal, hexagonal or other polygonal configuration. Also, the distal end portion 44 of each needle 42 may be in the form of a truncated cone whose cross-sectional area gradually increases inward from its end face along the longitudinal direction, as shown in FIG. 10. Further, the cross-sectional area of the remaining portion of each needle 42 may be square, as shown in FIG. 11. As a modification of the structure of FIG. 11, only one of the four peripheral sides of the distal end portion 44 may be cut so that the cross-sectional area of the distal end portion 44 is narrower than that of the remaining portion, as shown in FIG. 12.

Figure 13:
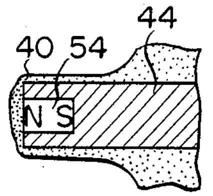
FIGS. 13 and 14 are longitudinal sectional views showing modifications of a magnetic ink attracting means for attracting magnetic ink to the end face of the distal end portion of each needle.
Figure 14:
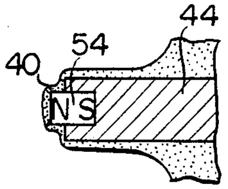
Figure 15:
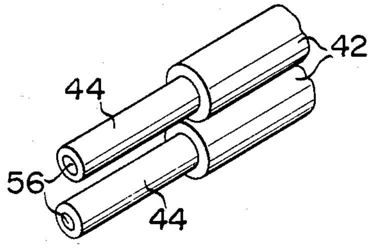
FIGS. 15 to 20 are enlarged perspective views showing various specific examples of another modification of the magnetic ink attracting means when applied to the end faces of the distal end portions of the needles shown in FIGS. 8 to 12.
Figure 16:
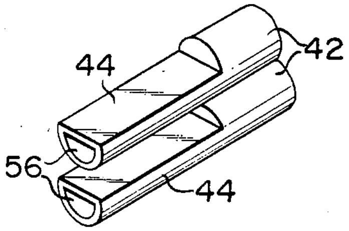
Figure 17:
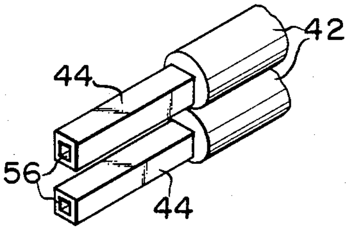
Figure 18:
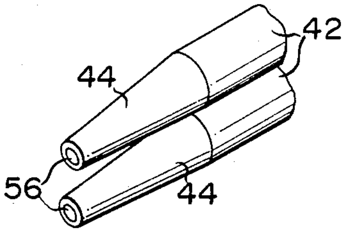
Figure 19:
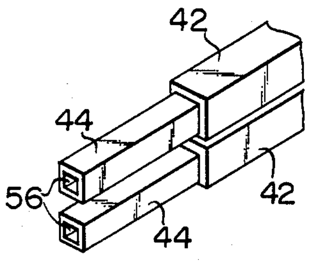
Figure 20:
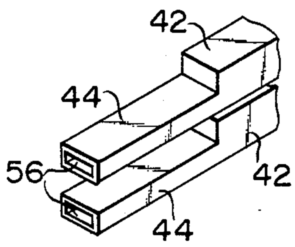

As shown in FIG. 13, moreover, a permanent magnet 54 may be buried in the end face of the distal end portion 44 of each needle 42 to form a magnetic ink attracting means for causing magnetic ink 40 to be coercively attached to the end face of the distal end portion 44. In this case, the end face of the permanent magnet 54 may be located flush with that of the distal end portion 44, as shown in FIG. 13, or the former may be projected from the latter, as shown in FIG. 14.

Figure 21:
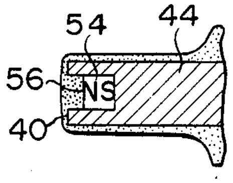
FIG. 21 is a vertical sectional view showing a combination of the modifications of the magnetic ink attracting means shown in FIGS. 13 and 14 and the additional modification shown in FIGS. 15 to 20.

Alternatively, the magnetic ink attracting means may be recesses 56 formed individually in the end faces of the needles 42 with various cross-sectional shapes, as shown in FIGS. 15 to 20, or may be formed by burying the permanent magnet 54 in each recess 56, as shown in FIG. 21.

Figure 22:
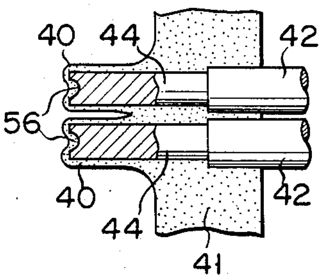
FIG. 22 is a broken-away side view showing how the needles with the magnetic ink attracting means shown in FIGS. 15 to 20 are located in the second position.

Since a sufficient amount of magnetic ink 40 is caught in the recesses 56 at a time, as shown in FIG. 22, the density of dots will not be lowered gradually even through the dots are formed by consecutively driving a single needle 42. The magnets 54 buried in the recesses 56 will ensure the coercive seizure of magnetic ink 40 in the recesses 56.

Figure 23:
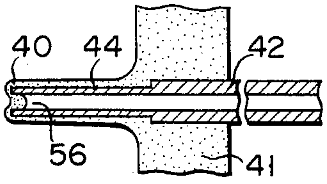
FIG. 23 is a longitudinal sectional view showing a further modification of the magnetic ink attracting means shown in FIGS. 15 to 20.

As shown in FIG. 23, furthermore, the recesses 56 may be each in the form of a through hole extending in the longitudinal direction of the needle 42. In this case, no air resistance, or no air cushion, is produced in the recesses 56, so that magnetic ink 40 can more quickly be caught in the recesses 56.

Figure 24:
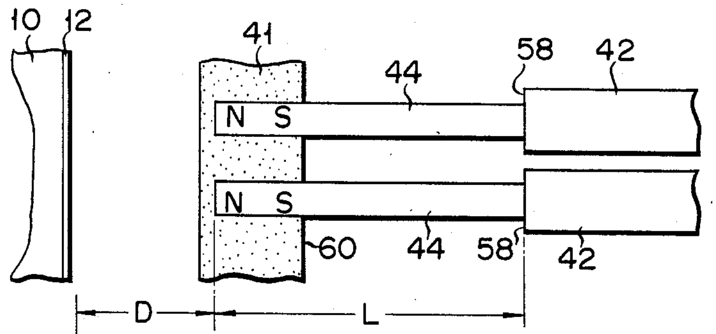
FIG. 24 is an enlarged side view showing how the needles having the modification of the magnetic ink retention preventing means shown in FIG. 6 are located in the first position.

In the ink-dot printer of the invention, moreover, if the cross-sectional area of the distal end portion 44 of each needle 42 is made narrower than that of the remaining portion of the needle 42, thereby forming a magnetic ink retention preventing means for preventing magnetic ink 40 from being retained between the distal end portions 44 of each two adjacent needles 42 by surface tension when the two needles 42 are simultaneously located to the second position, then the distance L from the border 58 between the distal end portion 44 and the remaining portion of each needle 42 in the first position to the outer surface 60 of the magnetic ink curtain 41 in the slit 32 facing the border 58 can be made greater than the distance D between the first and second positions of the needle 42, as shown in FIG. 24.

Figure 25:
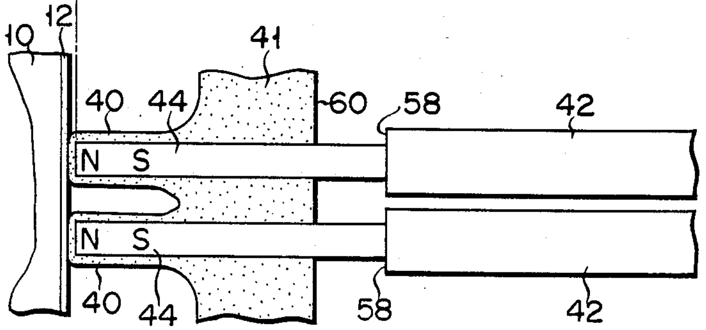
FIG. 25 is an enlarged side view showing how the needles of FIG. 24 are located in the second position.
Figure 26:
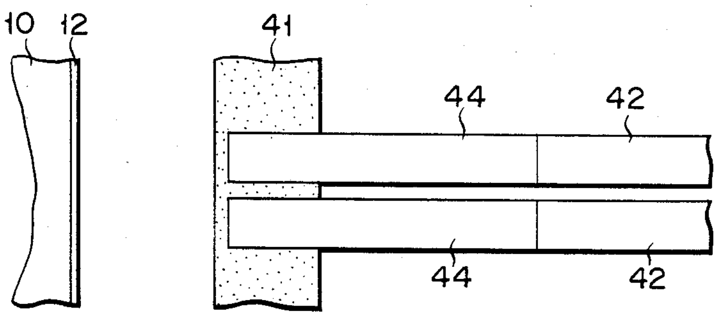
FIG. 26 is an enlarged side view showing how the needles with another modification of the magnetic ink retention preventing means are located in the first position.

With this arrangement, even though a step is formed on the border 58 between the distal end portion 44 and the remaining portion of each needle 42, as shown in FIG. 24, magnetic ink 40 from the magnetic ink curtain 41 will never be splashed on the recording sheet 12 when the needles 42 move from the first position to the second position shown in FIG. 25, since the step is kept from running against the outer surface 60 of the magnetic ink curtain 41 in the slit between the pair of pole plates.

According to the ink-dot printer, furthermore, the magnetic ink retention preventing means may be formed by coating the peripheral surface of the respective distal end portions 44 of the needles 42 with a water repellent.

Figure 27:
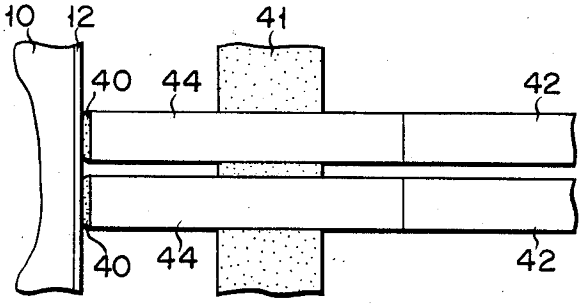
FIG. 27 is an enlarged side view showing how the needles of FIG. 26 are located in the second position.

With this arrangement, when the needles 42 are located in the second position, as shown in FIG. 27, magnetic ink 40 sticks only to the end face of each distal end portion 44 which is not coated with the water repellent. It will never stick to the peripheral surface of the distal end portion which is coated with the water repellent. It is to be understood that, also in this case, the distal end portion 44 may be magnetized, a recess may be formed in the end face of the distal end portion 44, or a permanent magnet may be buried in the end face.

Polytetrafluoroethylene is preferably used for the water repellent. The water repellent of this type is relatively high in durability, low-priced, and easily available.

What is claimed is:

1. An ink-dot printer comprising:

magnetic ink storage means storing magnetic ink;

a pair of pole plates facing each other so as to define a slit, one-end portion of which is contacted with the magnetic ink supplied from the magnetic ink storage means;

magnetic field generating means for magnetizing the pole plates, thereby feeding the magnetic ink from the magnetic ink storage means into the slit to form a magnetic ink curtain in the slit;

a plurality of needles arranged adjacent to one another along the longitudinal direction of the slit and adapted to selectively move in the longitudinal direction thereof between a first position where one-end portion of each needle is immersed in the magnetic ink curtain in the slit between the pole plates and a second position where the one-end portion is projected from the magnetic ink curtain in the slit;

magnetic ink attracting means for causing magnetic ink in the magnetic ink curtain in the slit to be coercively attracted to the one end portion of each needle by magnetic force; and magnetic ink retention preventing means for preventing magnetic ink from being retained between the one-end portions of any two adjacent needles by surface tension when the two needles are simultaneously located in said second position.

2. The ink-dot printer according to claim 1, wherein said magnetic ink attracting means is formed by magnetizing the one end portion of each said needle.

3. The ink-dot printer according to claim 2, wherein said magnetic ink retention preventing means comprises a water repellent coated on the peripheral surface of the respective one end portions of the needles.

4. The ink-dot printer according to claim 3, wherein said water repellent is polytetrafluoroethylene.

5. The ink-dot printer according to claim 2, wherein said magnetic field generating means comprises an electromagnet.

6. The ink-dot printer according to claim 2, wherein said magnetic ink retention preventing means comprises a narrow cross-sectional area portion at said one end portion of each said needle, said narrow cross-sectional area portion being narrower than the remaining portion of the needle so that the distance between said one end portions of any two adjacent needles is widened to prevent the magnetic ink from being retained between the portions adjacent to the end faces of said one end portions by surface tension when the two needles are simultaneously located in said second position.

7. The ink-dot printer according to claim 6, wherein said magnetic field generating means comprises an electromagnet.

8. The ink-dot printer according to claim 6, wherein the distance from the border between the one end portion and the remaining portion of each said needle in said first position to the outer surface of the magnetic ink curtain in the slit facing the border is greater than the distance between said first and second positions of the needle.

9. The ink-dot printer according to claim 6, wherein the cross section of the one end portion of each said needle is circular.

10. The ink-dot printer according to claim 6, wherein the cross section of the one end portion of each said needle is substantially semicircular.

11. The ink-dot printer according to claim 9, wherein the peripheral surface of the one-end portion of each needle is a substantially circular truncated cone.

12. The ink-dot printer according to claim 1, wherein said magnetic ink attracting means comprises magnets buried in the end faces of the one end portions of said plurality of needles.

13. The ink-dot printer according to claim 12, wherein said magnetic ink retention preventing means comprises a water repellent coated on the peripheral surface of the respective one end portions of each of said needles.

14. The ink-dot printer according to claim 13, wherein said water repellent is polytetrafluoroetylene.

15. The ink-dot printer according to claim 12, wherein said magnetic field generating means comprises an electromagnet.

16. The ink-dot printer according to claim 12, wherein said magnetic ink retention preventing means comprises a narrow cross-sectional area portion at said one-end portion of each needle, said narrow cross-sectional area portion being narrower than the remaining portion of the needle so that the distance between said one-end portions of any two adjacent needles is widened to prevent the magnetic ink from being retained between the portions adjacent to the end faces of said one-end portions by surface tension when the two needles are simultaneously located in said second position.

17. The ink-dot printer according to claim 16, wherein said magnetic field generating means comprises an electromagnet.

18. The ink-dot printer according to claim 16, wherein the distance from the border between the one end portion and the remaining portion of each said needle in said first position to the outer surface of the magnetic ink curtain in the slit facing the border is greater than the distance between said first and second positions of the needle.

19. The ink-dot printer according to claim 16, wherein the cross section of the one end portion of each said needle is circular.

20. The ink-dot printer according to claim 16, wherein the cross section of the one end portion of each said needle is substantially semicircular.

21. The ink-dot printer according to claim 16, wherein the cross section of the one end portion of each said needle is polygonal.

22. The ink-dot printer according to claim 19, wherein the peripheral surface of the one-end portion of each needle is a substantially circular truncated cone.

23. The ink-dot printer according to claim 6, wherein the cross section of the one end portion of each said needle is polygonal.

* * * * *